UNITED STATES PATENT OFFICE.

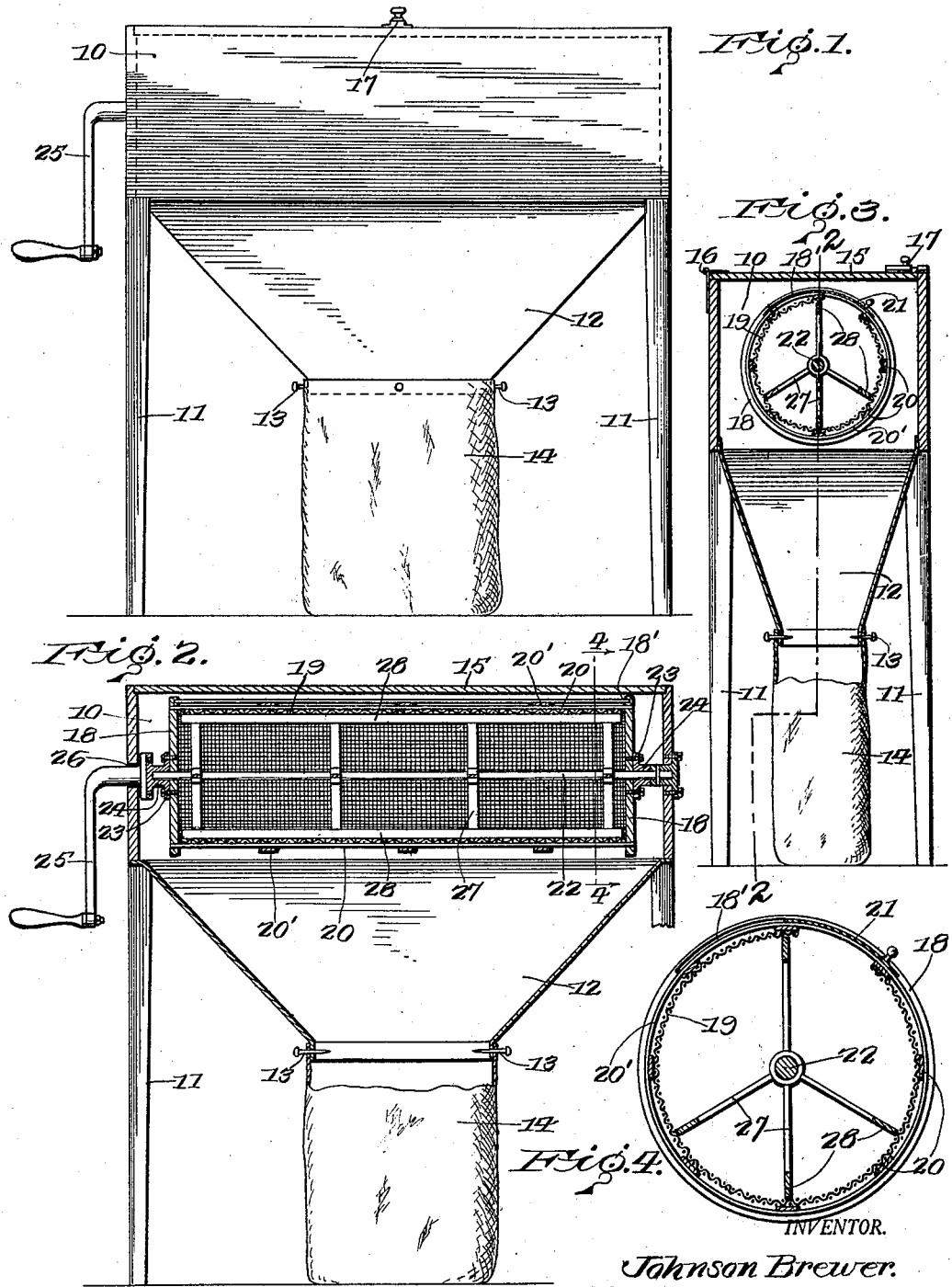

JOHNSON BREWER, OF RICE, TEXAS.

FLOUR-SIFTER.

1,390,334.  Specification of Letters Patent.  Patented Sept. 13, 1921.

Application filed February 10, 1921. Serial No. 443,843.

*To all whom it may concern:*

Be it known that I, JOHNSON BREWER, a citizen of the United States, residing at Rice, in the county of Navarro, State of Texas, have invented certain new and useful Improvements in Flour-Sifters; and I do hereby declare the following to be a full, clear, and exact description of the invention, such as will enable others skilled in the art to which it appertains to make and use the same.

This invention relates to new and useful improvements in sifters and particularly to sifters for removing weevil, worms, mold, and the like from flour.

One object of the invention is to provide a device whereby a bag or sack of flour can be dumped into the sifting cylinder, the bag hung below the cylinder, and the flour sifted and discharged into the bag, with the result that the flour will be freed from vermin and fungous growths.

Another object is to provide a device of this character wherein the quick and effective breaking of lumps, and the efficient sifting of the flour, through the screen, can be accomplished in a short time and with little labor.

A further object is to provide a device of this character wherein the flour will be thrown, by centrifugal action, to all parts of the sifting cylinder, for action by the rubbers or scrapers.

Other objects and advantages will be apparent from the following description when taken in connection with the accompanying drawing.

In the drawing:

Figure 1 is a front elevation of a flour sifter made in accordance with the invention.

Fig. 2 is a vertical longitudinal central sectional view through the device, on the line 2—2 of Fig. 3.

Fig. 3 is a vertical transverse central sectional view through the device.

Fig. 4 is an enlarged vertical transverse sectional view on the line 4—4 of Fig. 2.

Referring particularly to the accompanying drawing, 10 represents an elongated box, formed from suitably heavy wood, or other material, and supported on the legs 11. The bottom of the box is preferably open, and secured to the box, and depending from said opening, is a downwardly tapering spout or funnel 12, the lower or smaller end of which is provided with pegs or pins 13, for supporting the mouth of the flour bag 14, which is engaged around the said lower end of the funnel. The top wall 15 of the box is preferably movable, and is hinged at 16, on one of its longer edges, and is provided with a latch, or securing device 17, at the opposite longer edge.

Disposed within the box, and extending longitudinally therewith, is a cylinder or drum, including the discal end walls 18, and the wire screen covering 19, longitudinal bars, arranged externally of the screen, and secured at their ends in the end walls 18, are provided at 20 to maintain the walls in proper spaced relation. A sliding door 21 extends the length of the cylinder and slides in the arcuate grooves 18' in the walls 18, to permit introduction of the flour to be sifted. Surrounding the cylinder externally of the longitudinal bars 20, are the rings 20' the same being suitably secured to said bars and serving to add to the rigidity of the cylinder, as well as to hold the bars in proper parallel spaced relation to each other.

Extending longitudinally through the center of the cylinder, and with its ends disposed through the centers of the end walls 18, is a shaft 22, one end being secured to the adjacent end wall of the box 10, so that said shaft will be prevented from rotation. Secured to the outer face of the center of each wall 18, is a casting 23, having a central outwardly extending hollow boss 24 through which the end portions of the shaft 22 are disposed, said cylinder being arranged to rotate on said shaft ends. To one of the bosses 24 there is secured a crank handle 25 which extends through an opening 26, in the end wall of the box, remote from the wall of the box to which the shaft end is secured, said crank handle being arranged externally of the end of the box to be grasped for rotating the cylinder.

Secured to and extending radially from the shaft 22, are the arms 27, the same being arranged in longitudinal alinement, and having secured to their outer ends the longitudinally extending rubber or scraper blades 28, which bear with sufficient weight against the inner face of the screen of the cylinder, to prevent passage of the flour therebetween.

As will be understood, as the screen cylinder is turned on its axis, the screen bears and rubs against the blades 28, so that the flour is properly sifted and discharged through the meshes of the screen. Rapid rotation of the cylinder will cause the flour to fly upwardly toward the upper side of the cylinder, and be again attacked and rubbed by the blades and screen. Thus all of the blades, in spite of the fact that they do not move in the cylinder, will act on the flour. It will also be noted that by this construction, the revolving cylinder constantly presents new portions of screen to the blades, and thus prevents a continuous wear at any one point, with the resultant early destruction thereof.

It will be particularly noted that certain of the arms 27 radiate from the shaft 22 at angles of approximately forty-five degrees, and at opposite sides of the downwardly extending vertical arm. These two arms 27, with their rubber blades 28, serve to hold back the flour and prevent crowding of the large amount at the bottom of the cylinder, at the lowermost blade 28. The flour falls over the inner edges of the angularly arranged blades, to the bottom. Furthermore as the cylinder is rotated the flour is lifted, to some degree, above the inclined arms, and falls back against the blades thereof.

What is claimed is:

A flour cleaner including a housing having a lower discharge opening, a rotatable sifting drum mounted longitudinally in the housing, a longitudinal central and stationary shaft disposed through the center of the drum and supported at its ends in the ends of the housing, a plurality of arms secured to the shaft and extending vertically therefrom in a longitudinal series, a plurality of arms secured to the shaft and extending vertically downwardly therefrom in a longitudinal series, a longitudinal series of downwardly and outwardly inclining arms secured to the shaft and extending at opposite sides of the downwardly extending vertical arms, and scraper blades secured to the outer ends of the arms of each series and in parallel relation to the shaft.

In testimony whereof, I affix my signature, in the presence of two witnesses.

JOHNSON BREWER.

Witnesses:
J. M. SIMPSON,
G. C. BRADDOCK.